Patented Jan. 19, 1937

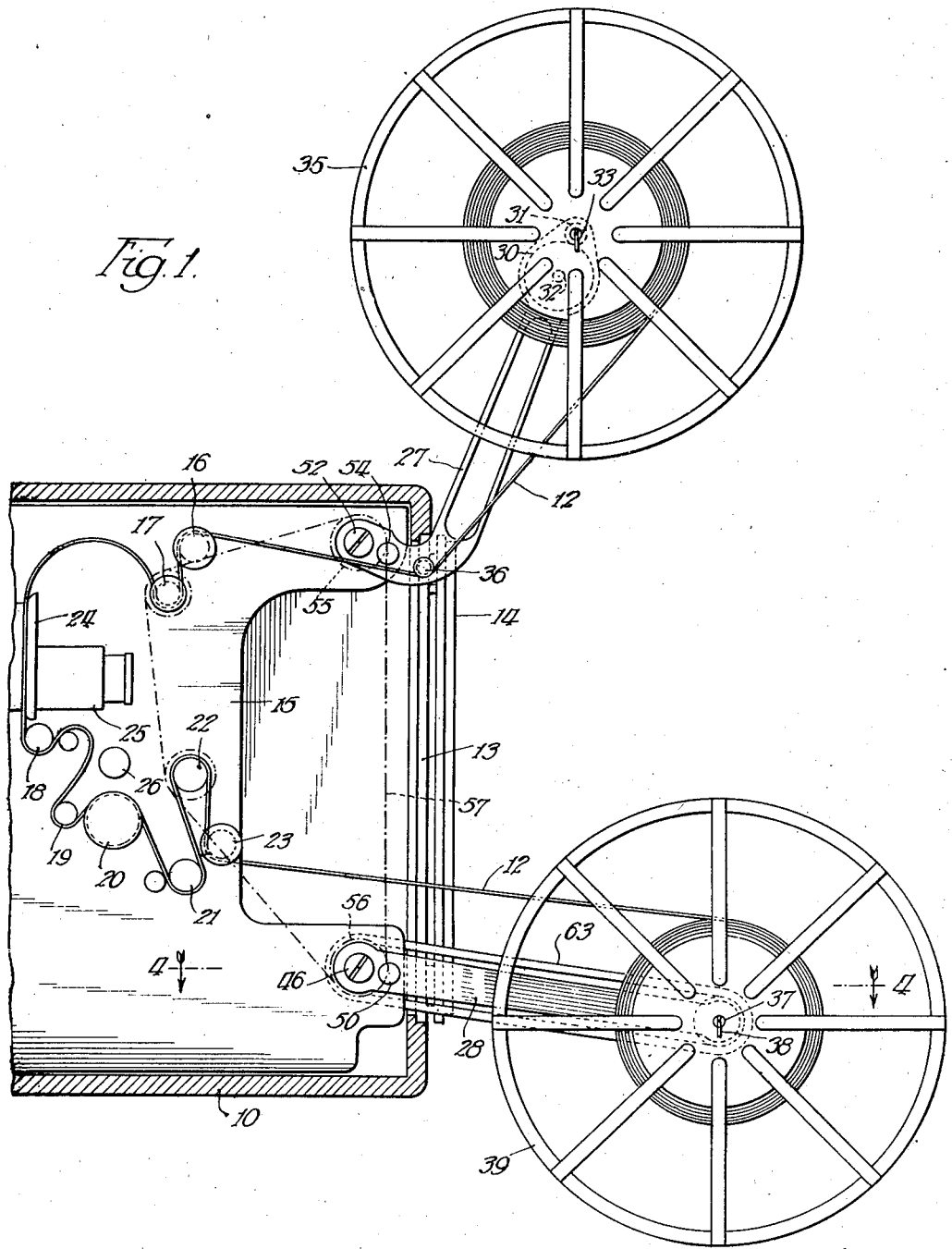

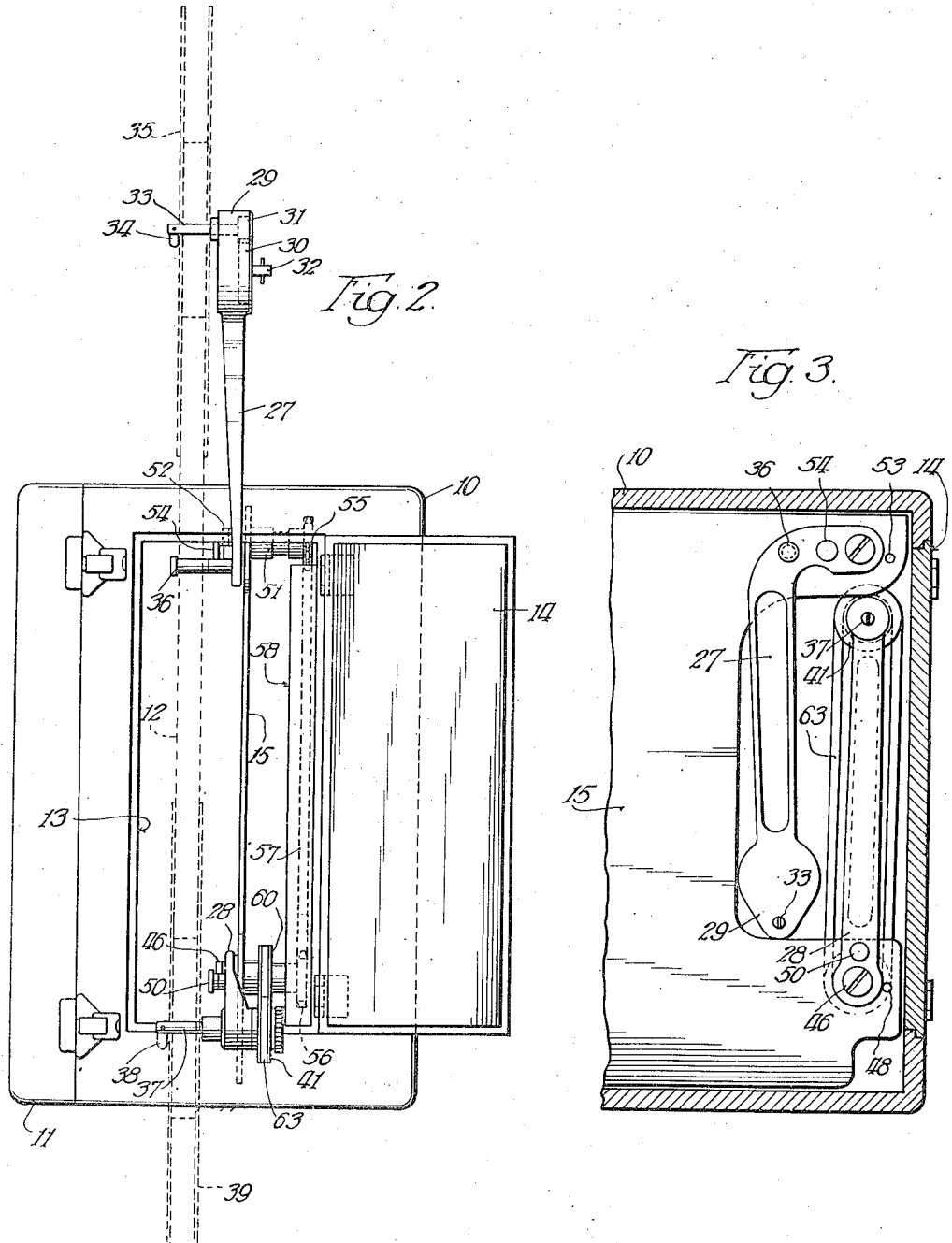

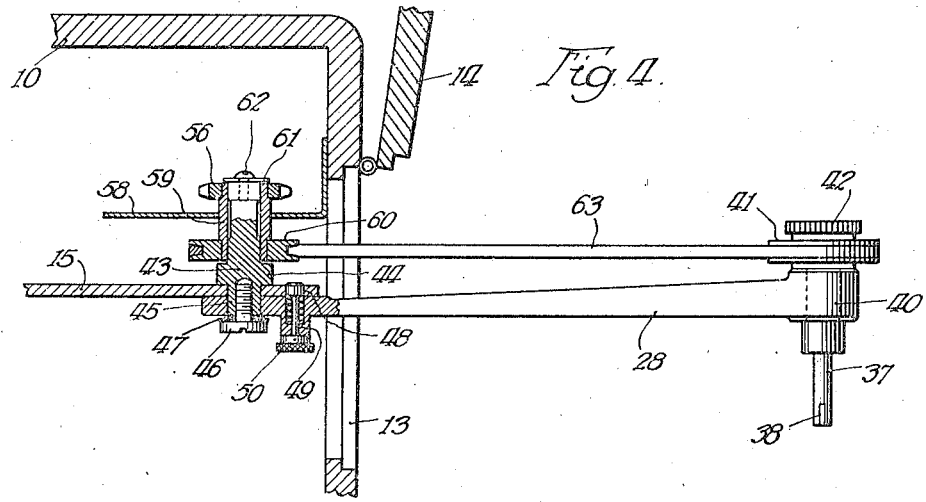
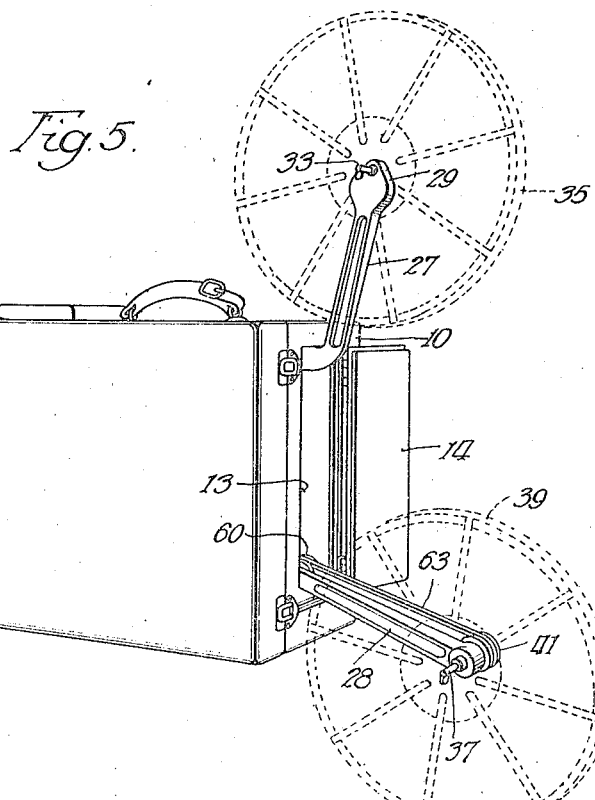

2,067,893

UNITED STATES PATENT OFFICE 2,067,893

PORTABLE PROJECTOR

Herman A. de Vry, Chicago, Ill.

Application February 29, 1936, Serial No. 66,335

9 Claims. (Cl. 242—55)

This invention relates to portable projectors for motion picture projection.

The principal purpose of the invention is to improve the film handling mechanism of the projector by providing means for mounting the film reel, which means, in the transportation of the apparatus, may be folded inside a housing for the apparatus so as to be out of the way and yet securely fastened in place ready to be folded out for use without delay.

Other and more specific objects and advantages will appear as the description proceeds in connection with the accompanying drawings wherein the preferred form of the invention is shown. It is to be understood, however, that the drawings and description are illustrative only and are not to be taken as limiting the invention except insofar as it is limited by the claims.

In the drawings—

Fig. 1 is a longitudinal sectional view through a portion of the projector illustrating my invention as applied thereto;

Fig. 2 is an end view of a projector embodying the invention;

Fig. 3 is a fragmentary sectional view taken on substantially the same line as Fig. 1 but showing the parts folded and having the film mechanism left out for the sake of clearness;

Fig. 4 is a sectional view taken substantially on the line 4—4 of Fig. 1; and

Fig. 5 is a perspective view of a projector housing showing the manner in which reels are mounted when the projector is in use.

Referring now in detail to the drawings, my invention is shown as applied to a portable projector which may include both sound and picture projection if desired. The mechanism is contained in a suitable housing 10 which preferably has a side door 11 that can be opened up for the purpose of threading a film 12 through a suitable film handling mechanism housed in the housing 10.

The projector housing 10 is also provided with an end opening 13 which is adapted to be closed by a door 14 when the projector is being carried from one location to another. Within the housing 10, there is a supporting panel 15 which is adapted to carry certain film handling mechanism by means of which the film 12 is presented to the picture projection lens and to a sound unit. This film handling mechanism preferably comprises a plurality of film guides such as 16, 17, 18, 19, 20, 21, 22, and 23.

The film guides just mentioned, guide the film 12 first through a film gate 24 associated with a projection lens 25, which may be of any suitable construction, and then past a light responsive device 26 which is a part of a sound reproducing mechanism such as is commonly used in talking motion picture projecting apparatus. The details of the projection devices form no part of the present invention and therefore will not be described further. It is believed to be sufficient to say that the various elements of the film handling mechanism are driven from a suitable source of power in the usual fashion to simultaneously project the pictures on the film and reproduce the sound recorded on the film. All of the mechanisms hereinbefore described as the film handling mechanism may be suitably supported on the panel 15 within the housing 10.

Now in order to feed the film 12 to the film handling mechanism from the reel and wind it upon a receiving reel, I have provided a supply reel supporting arm 27 and a receiving reel supporting arm 28. These arms fold inside the housing as shown in Fig. 3. The panel 15 is cut out as shown between the mountings of the arms 27 and 28 so the reel operating mechanism carried by these arms can be folded inside the housing.

The arm 27 has at its free end an enlarged housing 29 in which there is mounted a pair of gears 30 and 31. The gear 30 has a winding shaft 32 projecting therefrom while the gear 31 has a reel mounting shaft 33 projecting therefrom and provided with a suitable spring pressed reel securing toggle 34. A reel 35 for supplying film to the projector may thus be detachably mounted upon the arm 27. The arm 27 further carries a film guide roller 36 by means of which the film 12 is guided in through the opening 13 to the film guide member 16.

The arm 28 at its free end is provided with a film mounting shaft 37 which shaft is suitably journalled in the arm 28 and has a reel securing toggle 38 thereon for securing a reel 39 thereto. As best shown in Fig. 4, the shaft 37 has an enlarged portion 40 journalled in the arm 28 and, at the opposite end from the film receiving portion, this shaft has secured thereon a pulley 41 and a knurled knob 42. The purpose of the knob 42 is to permit turning on the shaft 37 by hand when desired.

The arm 28 and the arm 27 are secured to the panel 15 in such a fashion as to insure their alignment with the film handling mechanism within the housing 10. The mounting of the two arms is substantially the same so the description for one will suffice for both.

Referring now to Fig. 4 in particular, the arm 28 is secured to the panel 15 by a stud 43 which has a body portion 44 resting against one side of the panel 15 and a bearing portion 45 projecting through the panel and through the end of the arm 28.

A screw 46 is screw threaded into the bearing portion 45 to hold the arm 28 in place. A spring washer 47 is interposed between the head of the screw and the bearing portion 45. This provides a pivotal mounting for the arm 28 so that the arm may be extended from the housing 10 as shown in Fig. 1 or folded within the housing 10 as shown in Fig. 3. The spring washer 47 and the screw 46 are so tightened as to insure alignment of the arm 28 with the panel 15.

In order to lock the arm 28 in its operating or extended position, a small opening 48 is provided in the panel 15 and a spring pressed pin 49 is mounted in the arm 28. This pin is provided with a knurled head 50 so that it can be lifted out of the opening 48 to permit folding of the arm 28 into the position shown in Fig. 3.

The arm 27 is held in place by a stud 51 similar to the stud 43 and the arm 27 is clamped to the panel 15 by a screw 52 which is like the screw 46. The panel 15 has an opening 53 to receive a spring pressed pin 54 carried by the arm 27.

The studs 43 and 51 each carry a sprocket wheel, the stud 51 having a sprocket wheel 55 thereon and the stud 43 having a sprocket wheel 56 thereon. A chain 57 (see Fig. 1) is threaded over these wheels and is operated like the film handling mechanism from a suitable source of power not shown.

The wheels and the chain just mentioned are separated from the mechanism mounted on the panel 15 by a second panel or partition wall 58, the studs for the film driving members such as 17 and 22 being extended through this partition wall.

The sprocket wheel 56 which is rotatable on the stud 43 is connected to a pulley 60 by a sleeve 59 which is journalled for rotation upon the stud 43 and held in place by a washer 61 secured to the end of the stud 43 by a screw 62. The pulleys 60 and 41 are connected together by a drive belt 63, it being understood, of course, that the chain 57 being driven from a suitable source of power will drive the sprocket wheel 56 so as to in turn drive the pulleys 60 and 41 to rotate the shaft 47 and with it the receiving reel 39.

In the normal operation of the projector, the arms 27 and 28 are extended as shown in Fig. 1 and the film 12 is guided through the projector from the supply reel 35 to the receiving reel 39. The reels are held in alignment with the film handling mechanism within the projector by the arms 27 and 28 and the panel 15.

Now when it is desired to close up the machine, the only parts that are taken off are the empty reel 35 and the receiving reel 39 which now carries the film. These reels are removed from their respective shafts and then the arms 27 and 28 are folded within the casing to the position shown in Fig. 3. The door 14 and the door 11 may then be closed and the projector is ready to be moved with no excess parts to be stored away.

To set the machine in operation, it is only necessary to open the door 14 and pull out the arms 27 and 28 until their locking pins 49 and 54 snap into place in the openings in the panel 15. The machine is then ready for putting on the reels and threading the film.

From the above description, it is believed that the construction and advantages of this device will be readily apparent to those skilled in this art. Having thus described one specific form of my invention what I claim as new and desire to secure by Letters Patent is:

1. A portable projector comprising a housing, film handling mechanism in said housing, film reel mounting arms movably mounted in said housing, said arms comprising an arm having means thereon for supporting a supply reel and an arm having means thereon for supporting a film receiving reel, a door in one end of said housing, said arms being movable on their mountings to project through said door in reel supporting positions from an inoperative position wholly within said housing.

2. A portable projector comprising a housing, film handling mechanism in said housing, film reel mounting arms movably mounted in said housing, said arms comprising an arm having means thereon for supporting a supply reel and an arm having means thereon for supporting a film receiving reel, a door in one end of said housing, said arms being movable on their mountings to project through said door in reel supporting positions from an inoperative position wholly within said housing, and a drive belt for the receiving reel movable with the receiving arm.

3. A portable projector comprising a housing, film handling mechanism in said housing, film reel supporting arms, means movably mounting said arms in the housing, said housing being apertured to provide passageway for extending the free ends of said arms outside the housing, said arms having means at their free ends for detachably mounting film reels thereon, said arms being foldable within the housing.

4. A portable projector comprising a housing, film handling mechanism in said housing, film reel supporting arms, means movably mounting said arms in the housing, said housing being apertured to provide passageway for extending the free ends of said arms outside the housing, said arms having means at their free ends for detachably mounting film reels thereon, said arms being foldable within the housing, and a reel driving belt carried by one of said arms.

5. A portable projector comprising a housing, film handling mechanism in said housing, film reel supporting arms, means movably mounting said arms in the housing, said housing being apertured to provide passageway for extending the free ends of said arms outside the housing, said arms having means at their free ends for detachably mounting film reels thereon, said arms being foldable within the housing, said mounting means for said arms comprising a panel in said housing, pivot members for said arms carried by said panel, and lock pins spaced from said pivot members for locking said arms in extended position.

6. A portable projector comprising a housing, film handling mechanism in said housing, film reel mounting arms movably mounted in said housing, said arms comprising an arm having means thereon for supporting a supply reel and an arm having means thereon for supporting a film receiving reel, a door in one end of said housing, said arms being movable on their mountings to project through said door in reel supporting positions from an inoperative position wholly within said housing, said mounting means for said arms comprising a panel in said housing, pivot members for said arms carried by said panel, and lock pins spaced from said pivot members for locking said arms in extended position.

7. A portable projector comprising a housing, film handling mechanism in said housing, film reel supporting arms, means movably mounting said arms in the housing, said housing being apertured to provide passageway for extending the free ends of said arms outside the housing, said arms having means at their free ends for detachably mounting film reels thereon, said arms being foldable within the housing, and a reel driving belt carried by one of said arms, said mounting means for said arms comprising a panel in said housing, pivot members for said arms carried by said panel, and lock pins spaced from said pivot members for locking said arms in extended position.

8. A portable projector comprising a housing, film handling mechanism in said housing, film reel mounting arms movably mounted in said housing, said arms comprising an arm having means thereon for supporting a supply reel and an arm having means thereon for supporting a film receiving reel, a door in one end of said housing, said arms being movable on their mountings to project through said door in reel supporting positions from an inoperative position wholly within said housing, said supply reel arm having a film guiding roller thereon.

9. A portable projector comprising a housing, film handling mechanism in said housing, film reel supporting arms, means movably mounting said arms in the housing, said arms having means at their free ends for detachably mounting film reels thereon, said arms being foldable within the housing, said mounting means for said arms comprising a panel in said housing, pivot members for said arms carried by said panel, the film reel mounting means on one of said arms comprising a driven shaft, a pulley on said shaft, a second pulley journalled on the pivot member for said one arm, a belt connecting said pulleys, and a drive sprocket fixed to said second pulley.

HERMAN A. DE VRY.